(12) United States Patent
Danzer

(10) Patent No.: US 8,240,544 B2
(45) Date of Patent: Aug. 14, 2012

(54) INTRODUCTION OF NANOPARTICLES

(75) Inventor: Wolfgang Danzer, Dorfen (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 12/913,263

(22) Filed: Oct. 27, 2010

(65) Prior Publication Data

US 2011/0265928 A1    Nov. 3, 2011

Related U.S. Application Data

(63) Continuation-in-part of application No. 11/995,703, filed as application No. PCT/EP2006/007180 on Jul. 20, 2006, now abandoned.

(30) Foreign Application Priority Data

Aug. 2, 2005    (DE) .......................... 10 2005 036 309

(51) Int. Cl.
*B23K 31/02*    (2006.01)
*B23K 26/00*    (2006.01)
*B29C 65/10*    (2006.01)
*B29C 65/16*    (2006.01)

(52) U.S. Cl. .......... 228/121; 228/244; 228/261; 156/60; 219/76.14; 219/121.14; 219/121.64; 264/482

(58) Field of Classification Search .................. None
See application file for complete search history.

(56) References Cited

U.S. PATENT DOCUMENTS

| | | | | |
|---|---|---|---|---|
| 2,441,176 A | * | 5/1948 | Wilson et al. | ............. 219/137 R |
| 2,966,427 A | * | 12/1960 | Elmer | ...................... 427/255.26 |
| 3,320,402 A | * | 5/1967 | Cunningham | ............ 219/137 R |
| 3,351,734 A | * | 11/1967 | Arikawa et al. | ............ 219/137 R |
| 3,511,960 A | * | 5/1970 | Jean De Haeck | ................ 219/73 |
| 3,581,039 A | * | 5/1971 | Kanzaki et al. | ................ 219/73 |
| 4,042,163 A | * | 8/1977 | Schladitz | ....................... 228/198 |
| 4,908,226 A | * | 3/1990 | Kubena et al. | ................ 427/526 |
| 6,051,274 A | * | 4/2000 | Huber et al. | .................. 427/180 |
| 6,428,596 B1 | | 8/2002 | Urevich et al. | |
| 6,674,047 B1 | | 1/2004 | Hughes et al. | |
| 8,002,169 B2 | * | 8/2011 | Miller et al. | .................. 228/165 |
| 2002/0020734 A1 | * | 2/2002 | Meier | ........................... 228/119 |
| 2004/0050913 A1 | | 3/2004 | Philip | |
| 2004/0245648 A1 | | 12/2004 | Nagasawa et al. | |
| 2009/0068492 A1 | * | 3/2009 | Fujii et al. | ..................... 428/615 |

FOREIGN PATENT DOCUMENTS

| | | | | |
|---|---|---|---|---|
| JP | 53-113734 A | * | 10/1978 | |
| JP | 01-178375 A | * | 7/1989 | |
| JP | 02-099279 A | * | 4/1990 | |
| JP | 06-015470 A | * | 1/1994 | |

OTHER PUBLICATIONS

ISO Standards DIN ISO 85701:2002-11 (no date available).*
The Welding Handbook vol. 1 (no date available).*

* cited by examiner

*Primary Examiner* — Kiley Stoner

(74) *Attorney, Agent, or Firm* — Philip H. Von Neida

(57) ABSTRACT

The invention relates to a method for joining objects made of metal, plastic or ceramic by means of heat input such as soldering or welding, wherein materials such as particles, in particular nanoparticles, elements, atoms, molecules or ions are introduced into the joint. It is proposed according to the invention that a gas stream brings gaseous compounds to the joint which decompose at elevated temperature and deposit particles.

14 Claims, No Drawings

INTRODUCTION OF NANOPARTICLES

CROSS REFERENCE TO RELATED APPLICATIONS

This application claims priority from U.S. patent application Ser. No. 11/995,703 filed Jan. 15, 2008, which claims priority from WO Patent Application PCT/EP2006/007180, filed Jul. 20, 2006, published as WO 2007/014648, which claims priority from German Patent Application 102005036309.1, filed Aug. 2, 2005.

BACKGROUND OF THE INVENTION

The invention relates to a method for joining objects made of metal, plastic or ceramic by heat input such as soldering and welding wherein materials selected from the group consisting of particles, nanoparticles, elements, atoms, molecules and ions are introduced into a joint by directing a gas stream containing gaseous compounds to the joint which will decompose at elevated temperature and deposit the materials in the joint.

Joining methods for metals by means of heat such as welding and soldering are well known. In all cases, heat is introduced to the joint either by electrical energy, by combustion, by an arc, by laser, by friction or in some other way, whereby either one or both of the metals to be joined is melted or wherein a solder is melted which effects an intimate joining of the parts to be joined. These processes can be influenced very favourably if nanoparticles are introduced into the joining zone.

When welding plastic or when joining ceramics, temperature ranges other than for metals should naturally be observed.

Known from US 2004/0050913 A1 is a soldering method in which the solder contains nanoparticles. This solder is applied mechanically to the joining point as usual and then melted by heating.

Known from US 2004/0245648 A1 is a joining method which is used for high-temperature soldering. The solder contains nanoparticles. This solder is also applied mechanically as usual.

Known from U.S. Pat. No. 6,428,596 and from U.S. Pat. No. 6,674,047 are powders which can be used during thermal spraying or during welding. These powders also contain nanoparticles. The nanoparticles are applied, as is usual in thermal spraying, by an air or gas stream which brings the hot particles to the joint.

In all these methods, the nanoparticles have the effect that they particularly modify the physics in the joining region. As a result of the presence of nanoparticles, positive physical properties are initiated in the process.

SUMMARY OF THE INVENTION

It is the object of the invention to propose an alternative form of introducing active substances.

This object is achieved according to the invention by a method for joining objects made of metal, plastic or ceramics with materials. These materials are selected from particles, particularly nanoparticles, elements, atoms, molecules and ions. A gas stream brings gaseous compounds and the materials to a joint of the metal, plastic or ceramic to be joined and the gaseous compounds will decompose depositing the materials on the metal, plastic or ceramic joint. Embodiments of the invention are the subject matter of dependent claims.

The invention further provides for a method for joining objects selected from the group consisting of objects made from metal, plastic and ceramic by means of heat input selected from the group consisting of solder and welding wherein the objects are heated to a melted state, wherein materials are introduced into a joint of the objects, characterised in that a gas stream brings gaseous compounds to the joint which decompose at elevated temperature and deposit particles.

The invention further provides for a method for introducing particles into a joint of objects to be joined selected from the group consisting of objects made from metal, plastic and ceramic comprising heating the objects to a melted state by a heat input selected from the group consisting of solder and welding and feeding a gas stream containing gaseous compounds to the joint in the objects wherein the gaseous compounds decompose at elevated temperature and deposit the particles in the objects.

DETAILED DESCRIPTION OF THE INVENTION

According to the invention, a gas stream is used to bring gaseous compounds to the joint which then decompose at the elevated temperature at the joint and at the same time deposit particles such as nanoparticles (i.e., solids) but also individual atoms, molecules, element or ions. According to the invention, the methods known per se for supplying protective gas to the joint are used but no process gas which is "really" gaseous hitherto and remains gaseous is used here, but a gas containing substances which deposit solids. The gas stream can contain air, nitrogen, noble gases, inert or reactive gases ($CO_2$) as carrier component(s). The phase conversion by elevated temperature is an absolutely new process for the joining method. Hitherto, as shown in the prior art, solids have been introduced mechanically or brought to the joint as already-solid particles by means of a gas stream (thermal spraying). What is now new is that the process begins with a "genuine" gas which deposits solids above a certain temperature. One embodiment of the invention uses metallic compounds which contain metals in gaseous form and separate out the metal at high temperature.

Metals, metal ions or elements such as silicon and boron are preferably introduced into the joint.

Particularly preferably used are organometallic compounds such as nickel tetracarbonyl or iron pentacarbonyl which decompose at temperature above 200° C. in the joining region to give individual metal atoms. These then form the starting material for ideal nanoparticles. The joining processes are then substantially improved by pressing. Thus, transport of gaseous metal compounds is provided according to the invention, where these metal compounds are gaseous in the gas stream at ambient temperature and decompose and deposit particles or atoms at an elevated temperature at the desired locations. They act there as nanoparticles or as an active thin layer or as a microalloy.

It is particularly advantageous if the metal is introduced in gaseous form and it can be released at locations which cannot be reached with conventional transport processes. Thus, the gas can, for example, easily reach cavities and undercuts. Such locations frequently cannot be reached by mechanical application or by spraying-on.

Having thus described our invention, what I claim is:

1. A method for joining objects selected from the group consisting of objects made from plastic and ceramic by means of heat input selected from the group consisting of soldering and welding wherein a solder is melted or one or both of said objects to be joined is melted respectively by introducing said heat by a method selected from the group consisting of an arc and a laser, wherein materials are introduced into a joint of said objects, characterised in that a gas stream brings gaseous compounds to said joint which decompose at elevated temperature and deposit particles.

2. The method according to claim 1, characterised in that said materials are selected from the group consisting of particles, elements, atoms, molecules and ions.

3. The method according to claim 2, characterised in that said particles are nanoparticles.

4. The method according to claim 1, wherein said temperature is above 200° C.

5. The method according to claim 1, characterised in that said compounds contain metals and deposit metal particles, ions or atoms at elevated temperature.

6. The method according to claim 1, characterised in that the compounds are organometallic.

7. The method according to claim 6, characterised in that said organometallic compounds are selected from the group consisting of iron pentacarbonyl.

8. A method for introducing particles into a joint of objects to be joined selected from the group consisting of objects made from plastic and ceramic comprising heating said objects to a melted state by a heat input selected from the group consisting of soldering and welding wherein a solder is melted or one or both of said objects to be joined is melted respectively by introducing said heat by a method selected from the group consisting of an arc and a laser and feeding a gas stream containing gaseous compounds to said joint in said objects wherein said gaseous compounds decompose at elevated temperature and deposit said particles in said objects.

9. The method according to claim 8, characterised in that said materials are selected from the group consisting of particles, elements, atoms, molecules and ions.

10. The method according to claim 9, characterised in that said particles are nanoparticles.

11. The method according to claim 8, wherein said temperature is above 200° C.

12. The method according to claim 8, characterised in that said compounds contain metals and deposit metal particles, ions or atoms at elevated temperature.

13. The method according to claim 8, characterised in that the compounds are organometallic.

14. The method according to claim 13, characterised in that said organometallic compounds are selected from the group consisting of iron pentacarbonyl.

\* \* \* \* \*